US009733753B2

(12) United States Patent
Chen et al.

(10) Patent No.: US 9,733,753 B2
(45) Date of Patent: Aug. 15, 2017

(54) FLAT SELF-LUMINOUS TOUCH SWITCH

(71) Applicant: Rich IP Technology Inc., Taipei (TW)

(72) Inventors: Han-Chang Chen, Taipei (TW);
Yen-Hung Tu, Taipei (TW);
Chung-Lin Chia, Taipei (TW);
Chih-Wen Wu, Taipei (TW);
Jen-Chieh Chang, Taipei (TW)

(73) Assignee: RICH IP TECHNOLOGY INC., Taipei (TW)

( * ) Notice: Subject to any disclaimer, the term of this patent is extended or adjusted under 35 U.S.C. 154(b) by 88 days.

(21) Appl. No.: 14/814,453

(22) Filed: Jul. 30, 2015

(65) Prior Publication Data

US 2016/0034096 A1 Feb. 4, 2016

(30) Foreign Application Priority Data

Aug. 4, 2014 (TW) .............................. 103126605 A (51) Int. Cl.
*G06F 3/041* (2006.01)
*G06F 3/044* (2006.01)
*G09G 5/00* (2006.01)
*G06F 3/0354* (2013.01)

(52) U.S. Cl.
CPC ........ *G06F 3/0416* (2013.01); *G06F 3/03547* (2013.01); *G06F 3/044* (2013.01); *G06F 3/0412* (2013.01); *G09G 5/00* (2013.01)

(58) Field of Classification Search
CPC ........ G06F 3/033; G06F 3/041; G06F 3/0416; G06F 3/044; G06F 3/0412; G06F 3/03547; H01L 41/113; G09G 5/00
See application file for complete search history.

(56) References Cited

U.S. PATENT DOCUMENTS

| | | | | |
|---|---|---|---|---|
| 2005/0168108 A1* | 8/2005 | Face | .................. | H01H 13/7006 310/330 |
| 2010/0271315 A1* | 10/2010 | Bathiche | ............... | G06F 3/0202 345/173 |
| 2011/0007035 A1* | 1/2011 | Shai | ........................ | G06F 3/014 345/179 |
| 2013/0265276 A1* | 10/2013 | Obeidat | .................. | G06F 3/044 345/174 |
| 2014/0362032 A1* | 12/2014 | Mo | ........................ | G06F 3/0412 345/174 |
| 2015/0346896 A1* | 12/2015 | Hargreaves | ........... | G06F 3/0416 345/174 |

* cited by examiner

*Primary Examiner* — Lun-Yi Lao
*Assistant Examiner* — Johny Lau
(74) *Attorney, Agent, or Firm* — Guice Patents PLLC (57) ABSTRACT

A flat self-luminous touch switch, including: a self-luminous touch unit, including at least one flat self-luminous pixel and a pixel driving interface; and a switch control unit, including a first driving interface and a second driving interface, wherein, the first driving interface is coupled with the pixel driving interface to provide at least one pixel driving signal and transmit a touch detection signal; and the second driving interface provides an analog switch channel and/or at least one digital output signal according to a detection result of the touch detection signal.

15 Claims, 10 Drawing Sheets

FLAT SELF-LUMINOUS TOUCH SWITCH

BACKGROUND OF THE INVENTION

Field of the Invention

The present invention relates to a touch switch, especially to a flat self-luminous touch switch.

Description of the Related Art

Figure 1:
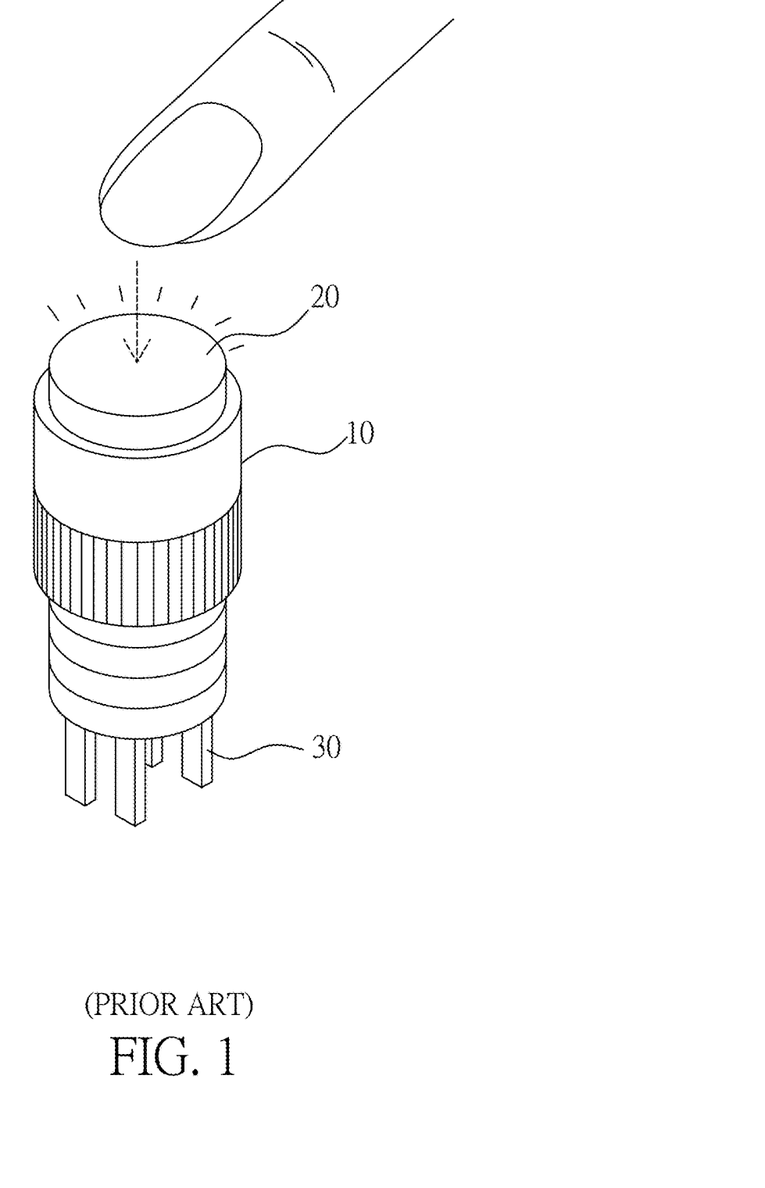
FIG. 1 illustrates an outline of a luminous push-button of prior art.

Please refer to FIG. 1, which illustrates an outline of a luminous push-button of prior art. As illustrated in FIG. 1, the luminous push-button of prior art has a body 10, a luminous button part 20, and a plurality of switch connection pins 30.

When in operation, an operator can change the interconnection status of the plurality of switch connection pins 30 by pressing the luminous button part 20.

However, there are mechanical switches (not shown in the figure) inside the body 10 and the mechanical switches generally have contact failure issue after a finite number of push operations on the luminous button part 20. Besides, dust and moisture can enter the body 10 via gaps between the body 10 and the luminous button part 20 to cause poor contact or short circuit phenomenon in the plurality of switch connection pins 30. As a result, the practical operation lifetime of the luminous push-button of prior art cannot satisfy the consumers. Besides, under the trend that the electronic products require a slim and small form factor, as small sized luminous push buttons cannot be easily assembled and cost high, luminous push buttons are therefore not suitable in some applications.

To solve the foregoing problems, a novel luminous switch structure is needed.

SUMMARY OF THE INVENTION

One objective of the present invention is to disclose a flat self-luminous touch switch, which is capable of providing a slim outline.

Another objective of the present invention is to disclose a flat self-luminous touch switch, which is capable of providing a curved outline.

Another objective of the present invention is to disclose a flat self-luminous touch switch, which is capable of providing a plurality of light colors, a plurality of color levels, and a plurality of displayed figures.

Another objective of the present invention is to disclose a flat self-luminous touch switch, which is capable of preventing dust and moisture from entering the switch.

Still another objective of the present invention is to disclose a flat self-luminous touch switch, which is capable of providing a longer operation lifetime.

To attain the foregoing objectives, a flat self-luminous touch switch is proposed, including:

a self-luminous touch unit, including at least one flat self-luminous pixel and a pixel driving interface; and a switch control unit, including a first driving interface and a second driving interface, wherein, the first driving interface is coupled with the pixel driving interface to provide at least one pixel driving signal and transmit a touch detection signal; and the second driving interface provides an analog switch channel and/or at least one digital output signal according to a detection result of the touch detection signal.

In one embodiment, the self-luminous touch unit provides at least one light color and at least one light emitting direction.

In one embodiment, the self-luminous touch unit further includes a resistive type touch sensing element.

In one embodiment, the self-luminous touch unit further includes a capacitive type touch sensing element, which is embedded in the at least one flat self-luminous pixel or attached atop the at least one flat self-luminous pixel.

In one embodiment, the flat self-luminous pixel is implemented by a self-luminous structure selected from a group consisting of EL, PLED, and OLED.

In one embodiment, the switch control unit further includes:

a touch detection unit, including a touch detection port to provide the touch detection signal and detect a signal parameter of the touch detection signal during a touch detection procedure, and the touch detection unit generating the detection result according to the signal parameter, wherein the touch detection port is coupled with the first driving interface;

a pixel driving unit, including at least one driving output end to provide the at least one pixel driving signal; and an interruptible pixel driving circuit, coupled between the first driving interface and the at least one driving output end of the pixel driving unit, including at least one isolation switch and at least one auxiliary capacitor, wherein, when the switch control unit performs the touch detection procedure, the at least one isolation switch will be switched off, and the at least one auxiliary capacitor will provide electric energy to maintain a display status of the at least one flat self-luminous pixel.

In one embodiment, the analog switch channel is selected from a group consisting of a semiconductor switch channel, a photo coupler switch channel, a relay switch channel, and a reed switch channel.

To attain the foregoing objectives, another flat self-luminous touch switch is proposed, including:

a self-luminous touch unit, including at least one AMOLED pixel and a pixel driving interface; and a switch control unit, including a first driving interface and a second driving interface, wherein, the first driving interface is coupled with the pixel driving interface to provide at least one pixel driving signal and transmit a touch detection signal; and the second driving interface provides an analog switch channel and/or at least one digital output signal according to a detection result of the touch detection signal.

In one embodiment, the self-luminous touch unit provides at least one light color and at least one light emitting direction.

In one embodiment, at least one electrode of each of the at least one AMOLED pixel is used for touch sensing.

In one embodiment, the self-luminous touch unit further includes an interruptible pixel driving circuit, coupled between the at least one AMOLED pixel and the pixel driving interface, including at least one isolation switch and at least one auxiliary capacitor, wherein, when the switch control unit performs a touch detection procedure, the at least one isolation switch will be switched off, and the at least one auxiliary capacitor will provide electric energy to maintain a display status of the at least one AMOLED pixel.

In one embodiment, the touch detection procedure is selected from a group consisting of self-capacitive touch detection procedure and mutual-capacitive touch detection procedure.

In one embodiment, the self-luminous touch unit further includes at least one constant current circuit to drive the at least one AMOLED pixel.

In one embodiment, the self-luminous touch unit further has a photo sensing element integrated therein.

In one embodiment, the self-luminous touch unit further has a solar cell integrated therein.

In one embodiment, the self-luminous touch unit further has an ESD (electrostatic discharge) protection element integrated therein.

In one embodiment, the switch control unit further includes:

a touch detection unit, including a touch detection port to provide the touch detection signal and detect a signal parameter of the touch detection signal, wherein the touch detection port is coupled with the first driving interface;

a pixel driving unit, including at least one driving output end to provide the at least one pixel driving signal; and an interruptible pixel driving circuit, coupled between the first driving interface and the pixel driving unit, including at least one isolation switch and at least one auxiliary capacitor, wherein, when the switch control unit performs the touch detection procedure, the at least one isolation switch will be switched off, and the at least one auxiliary capacitor will provide electric energy to maintain a display status of the at least one AMOLED pixel.

In one embodiment, the switch control unit is implemented by an integrated circuit having a package structure selected from a group consisting of COB, COG, COF, and SMT.

In one embodiment, the digital output signal conveys touch input information or gesture input information.

In one embodiment, the at least one AMOLED pixel displays at least one figure.

To attain the foregoing objectives, still another flat self-luminous touch switch is proposed, including:

a plurality of self-luminous touch units, each including at least one flat self-luminous pixel and a pixel driving interface;

a switch control unit, including a first driving interface, a second driving interface, and a multiplexing control interface, wherein, the first driving interface provides a plurality of pixel driving signals and transmit a plurality of touch detection signals; the second driving interface provides an analog switch channel and/or at least one digital output signal according to a detection result of one of the plurality of touch detection signals; and the multiplexing control interface provides a multiplexing control signal;

a multiplexer, having a control interface, an input interface, and an output interface, wherein the control interface is coupled with the multiplexing control signal, the output interface is coupled with the pixel driving interface of each of the plurality of self-luminous touch units; and a plurality of interruptible pixel driving circuits, coupled between the first driving interface and the input interface of the multiplexer, each including a unilateral switch and an auxiliary capacitor;

wherein, when the switch control unit performs a touch detection procedure, at least one of the unilateral switches will be switched off, and at least one of the auxiliary capacitors will provide electric energy to maintain a display status of at least one of the self-luminous touch units.

To make it easier for our examiner to understand the objective of the invention, its structure, innovative features, and performance, we use preferred embodiments together with the accompanying drawings for the detailed description of the invention.

BRIEF DESCRIPTION OF THE DRAWINGS

FIG. 3b illustrates a scenario where an operator performs a slide operation on the flat self-luminous touch switch of FIG. 3a.

DETAILED DESCRIPTION OF THE PREFERRED EMBODIMENTS

Figure 2:
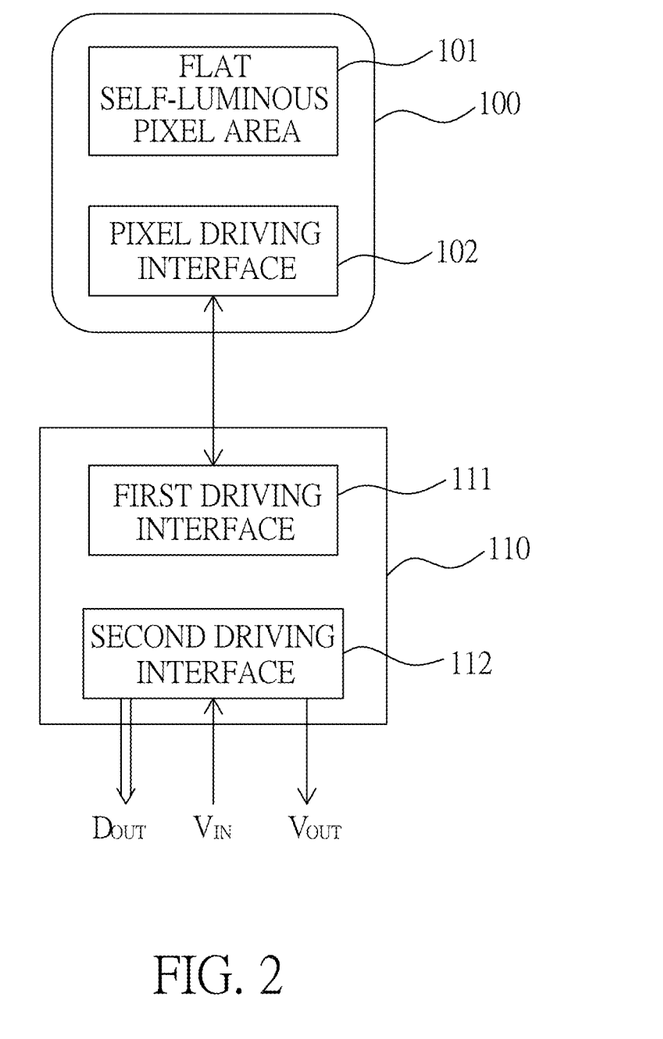
FIG. 2 is an illustrative diagram of a flat self-luminous touch switch of the present invention.

Please refer to FIG. 2, which is an illustrative diagram of a flat self-luminous touch switch of the present invention. As illustrated in FIG. 2, the flat self-luminous touch switch includes a self-luminous touch unit 100 and a switch control unit 110.

The self-luminous touch unit 100 includes a flat self-luminous pixel area 101 and a pixel driving interface 102, wherein the flat self-luminous pixel area 101 includes at least one flat self-luminous pixel and at least one light emitting direction for providing at least one light color, and the flat self-luminous pixel can be implemented by an EL (electroluminescent) self-luminous structure, a PLED (polymer light emitting diode) self-luminous structure, or an OLED (organic light emitting diode) self-luminous structure; and the pixel driving interface 102 is coupled with control signals from the switch control unit 110, and the control signals include a pixel driving signal and a touch detection signal.

The touch sensing function of the self-luminous touch unit 100 can be realized by: a) placing a resistive type touch sensing element or a capacitive type touch sensing element on the flat self-luminous pixel area 101; b) embedding a capacitive type touch sensing element in the flat self-luminous pixel; or c) directly using an electrode of the flat self-luminous pixel as a touch sensing electrode.

The switch control unit 110 includes a first driving interface 111 and a second driving interface 112, wherein, the first driving interface 111 is coupled with the pixel driving interface 102 to provide the control signal; and the second driving interface 112 provides an analog switch channel and/or at least one digital output signal $D_{OUT}$ according to a detection result of the touch detection signal. The analog switch channel has an input end for coupling with an input voltage $V_{IN}$ and an output end for providing an output voltage $V_{OUT}$, and the input voltage $V_{IN}$ can be a DC (direct current) voltage or an AC (alternative current) voltage, wherein the analog switch channel can be a semiconductor switch channel, a photo coupler switch channel, a relay switch channel, or a reed switch channel. As the present invention utilizes a flat self-luminous structure, the flat self-luminous touch switch is capable of providing a plurality of light colors and a plurality of color levels.

Figure 3A:
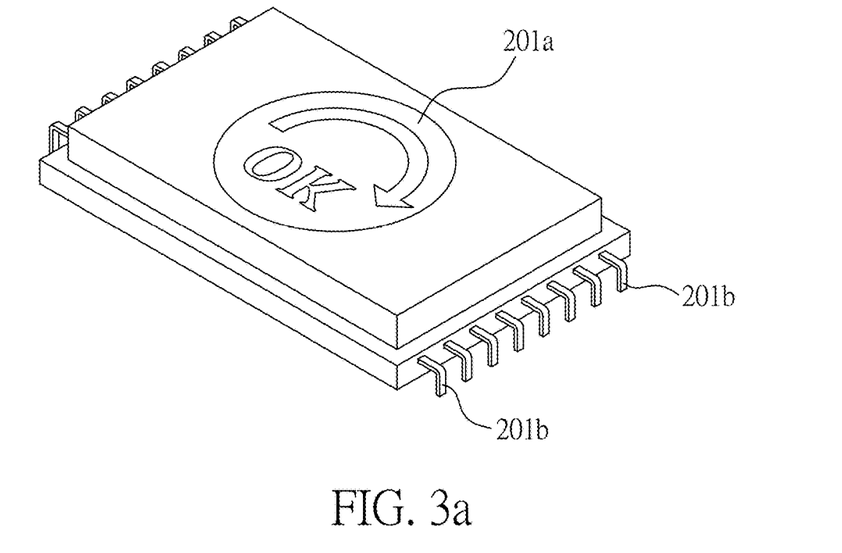
FIG. 3a illustrates an outline of a flat self-luminous touch switch of the present invention.
Figure 3B:
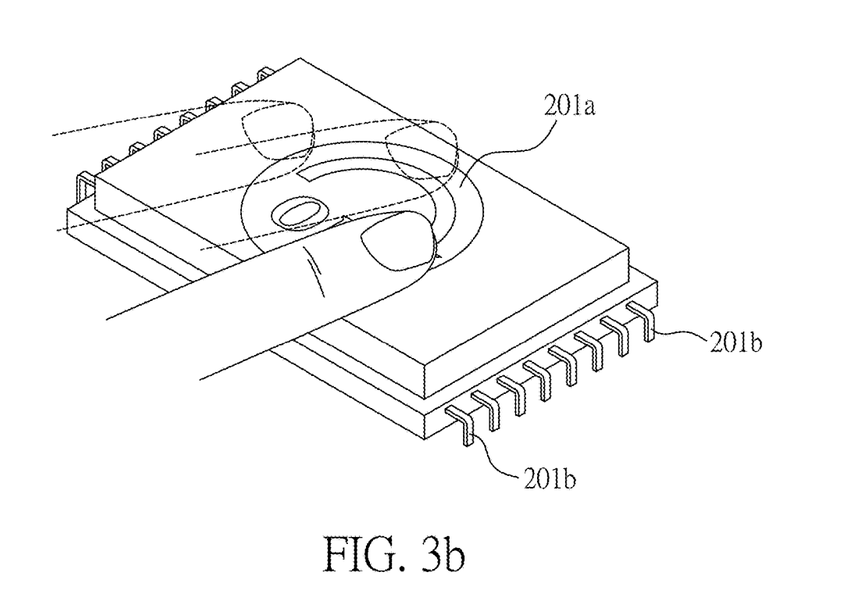

Please refer to FIG. 3a, which illustrates an outline of a flat self-luminous touch switch of the present invention. As illustrated in FIG. 3a, the flat self-luminous touch switch of the present invention has a slim outline and includes a flat self-luminous touch area 201a and a plurality of switch connection pins 201b. When in operation, as illustrated in FIG. 3b, an operator can perform a slide operation on a surface of the flat self-luminous touch area 201a according to a clockwise rotation indicative figure displayed in the flat self-luminous touch area 201a to switch on an analog switch channel and/or provide at least one digital output signal. Besides, as the flat self-luminous pixel can also be implemented on a curved surface, the flat self-luminous touch switch of the present invention can also provide a curved outline.

Besides, the switch control unit of the flat self-luminous touch switch of the present invention can be installed not only on a top substrate or a bottom substrate of the self-luminous touch unit, but on an external circuit board. The switch control unit can be implemented by an integrated circuit, and the package structure of the integrated circuit can be COB (chip on board)、COG (chip on glass)、COF (chip on film)、or SMT (surface mount technology).

Figure 4A:
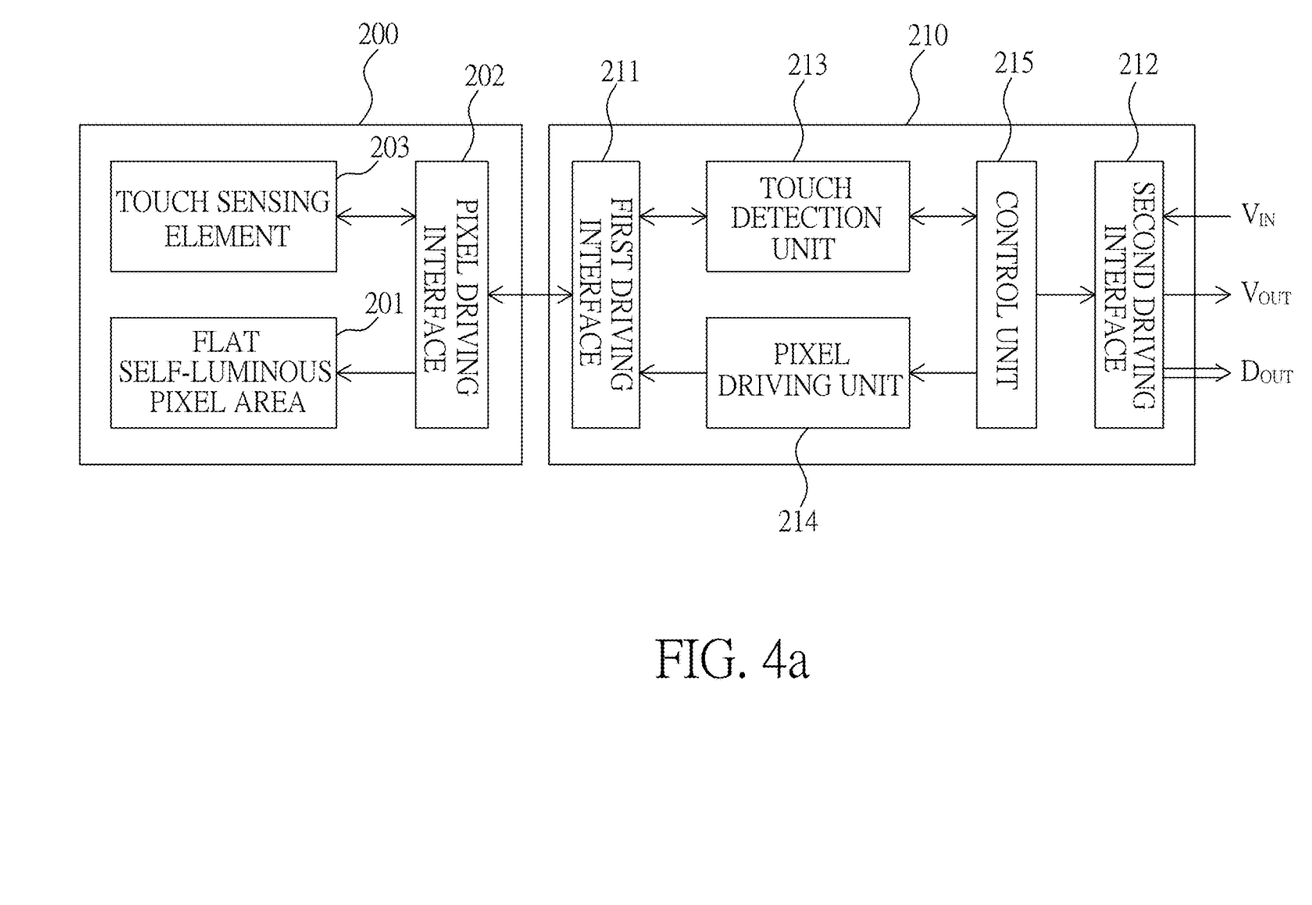
FIG. 4a illustrates a block diagram of a flat self-luminous touch switch according to an embodiment of the present invention.

Please refer to FIG. 4a, which illustrates a block diagram of a flat self-luminous touch switch according to an embodiment of the present invention. As illustrated in FIG. 4a, the flat self-luminous touch switch includes a self-luminous touch unit 200 and a switch control unit 210.

The self-luminous touch unit 200 includes a flat self-luminous pixel area 201, a pixel driving interface 202, and a touch sensing element 203, wherein, the pixel driving interface 202 is coupled with the flat self-luminous pixel area 201 and the touch sensing element 203; and the touch sensing element 203, which can be a resistive touch sensing element or a capacitive touch sensing element, is atop the flat self-luminous pixel area 201 and the attachment of the touch sensing element 203 to the flat self-luminous pixel area 201 can be realized by using a glue.

The switch control unit 210 includes a first driving interface 211, a second driving interface 212, a touch detection unit 213, a pixel driving unit 214, and a control unit 215, wherein, the first driving interface 211 is coupled with the pixel driving interface 202 to provide control signals including at least one pixel driving signal and a touch detection signal; and the second driving interface 212 provides an analog switch channel and/or at least one digital output signal $D_{OUT}$ according to a detection result of the touch detection signal. The analog switch channel has an input end for coupling with an input voltage $V_{IN}$ and an output end for providing an output voltage $V_{OUT}$, and the input voltage $V_{IN}$ can be a DC voltage or an AC voltage, wherein the analog switch channel can be a semiconductor switch channel, a photo coupler switch channel, a relay switch channel, or a reed switch channel.

The touch detection unit 213 includes a touch detection port to provide the touch detection signal, detect a signal parameter of the touch detection signal, and generate the detection result according to the signal parameter during a touch detection procedure, wherein the touch detection port is coupled with the first driving interface 211 and the touch detection procedure can be a self-capacitive touch detection procedure or a mutual-capacitive touch detection procedure.

The pixel driving unit 214 includes at least one driving output end to provide the at least one pixel driving signal, and the at least one driving output end is coupled with the first driving interface 211.

The control unit 215 is coupled with the second driving interface 212, the touch detection unit 213, and the pixel driving unit 214 to control the second driving interface 212 to provide an analog switch channel and/or at least one digital output signal $D_{OUT}$ according to the detection result. The analog switch channel has an input end for coupling with an input voltage $V_{IN}$ and an output end for providing an output voltage $V_{OUT}$, and the input voltage $V_{IN}$ can be a DC voltage or an AC voltage, wherein the analog switch channel can be a semiconductor switch channel, a photo coupler switch channel, a relay switch channel, or a reed switch channel.

Figure 4B:
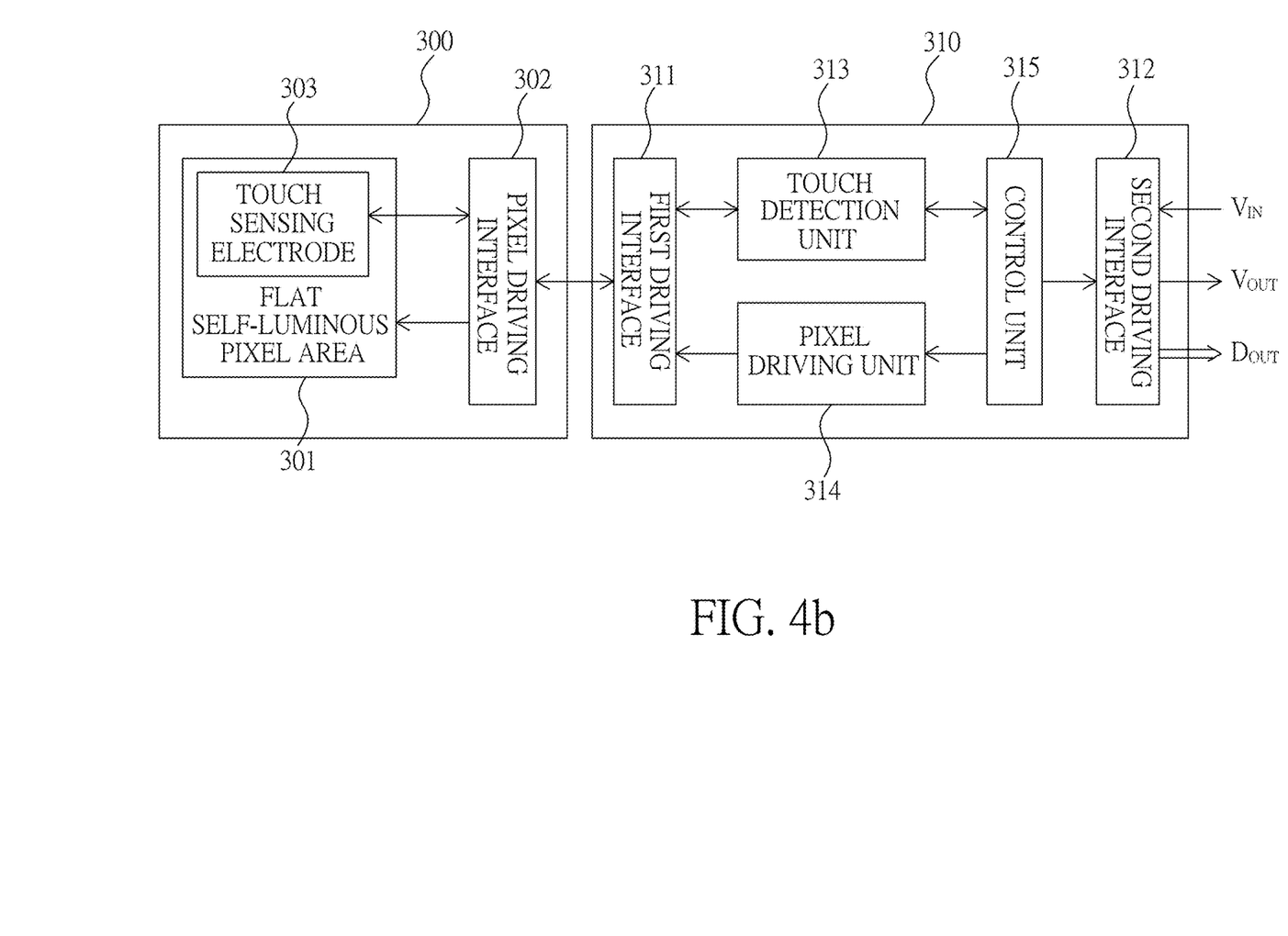
FIG. 4b illustrates a block diagram of a flat self-luminous touch switch according to another embodiment of the present invention.

Please refer to FIG. 4b, which illustrates a block diagram of a flat self-luminous touch switch according to another embodiment of the present invention. As illustrated in FIG. 4b, the flat self-luminous touch switch includes a self-luminous touch unit 300 and a switch control unit 310.

The self-luminous touch unit 300 includes a flat self-luminous pixel area 301, a pixel driving interface 302, and a touch sensing electrode 303 embedded in the flat self-luminous pixel area 301, wherein, the pixel driving interface 302 is coupled with the flat self-luminous pixel area 301 and the touch sensing electrode 303; and the touch sensing electrode 303 can be in a same plane with or above a pixel electrode (not shown in the figure) of the flat self-luminous pixel area 301.

The switch control unit 310 includes a first driving interface 311, a second driving interface 312, a touch detection unit 313, a pixel driving unit 314, and a control unit 315, wherein, the first driving interface 311 is coupled with the pixel driving interface 302 to provide control signals including at least one pixel driving signal and a touch detection signal; and the second driving interface 312 provides an analog switch channel and/or at least one digital output signal $D_{OUT}$ according to a detection result of the touch detection signal. The analog switch channel has an input end for coupling with an input voltage $V_{IN}$ and an output end for providing an output voltage $V_{OUT}$, and the input voltage $V_{IN}$ can be a DC voltage or an AC voltage, wherein the analog switch channel can be a semiconductor switch channel, a photo coupler switch channel, a relay switch channel, or a reed switch channel.

The touch detection unit 313 includes a touch detection port to provide the touch detection signal, detect a signal parameter of the touch detection signal, and generate the detection result according to the signal parameter during a touch detection procedure, wherein the touch detection port is coupled with the first driving interface 311 and the touch detection procedure can be a self-capacitive touch detection procedure or a mutual-capacitive touch detection procedure.

The pixel driving unit 314 includes at least one driving output end to provide the at least one pixel driving signal.

The control unit 315 is coupled with the second driving interface 312, the touch detection unit 313, and the pixel driving unit 314 to control the second driving interface 312 to provide an analog switch channel and/or at least one digital output signal $D_{OUT}$ according to the detection result. The analog switch channel has an input end for coupling with an input voltage $V_{IN}$ and an output end for providing an output voltage $V_{OUT}$, and the input voltage $V_{IN}$ can be a DC voltage or an AC voltage, wherein the analog switch channel can be a semiconductor switch channel, a photo coupler switch channel, a relay switch channel, or a reed switch channel.

Figure 4C:
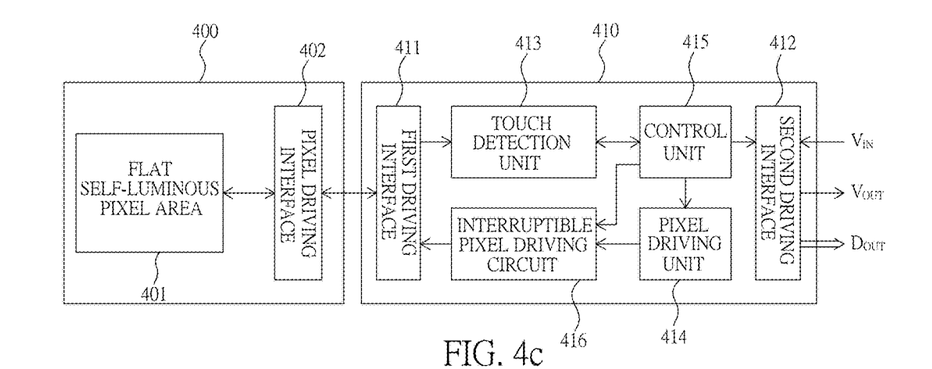
FIG. 4c illustrates a block diagram of a flat self-luminous touch switch according to another embodiment of the present invention.

Please refer to FIG. 4c, which illustrates a block diagram of a flat self-luminous touch switch according to another embodiment of the present invention. As illustrated in FIG. 4c, the flat self-luminous touch switch includes a self-luminous touch unit 400 and a switch control unit 410.

The self-luminous touch unit 400 includes a flat self-luminous pixel area 401 and a pixel driving interface 402, wherein, the pixel driving interface 402 has a plurality of conductive contacts coupled with a plurality of conductive contacts of the flat self-luminous pixel area 401.

The switch control unit 410 includes a first driving interface 411, a second driving interface 412, a touch detection unit 413, a pixel driving unit 414, a control unit 415, and an interruptible pixel driving circuit 416, wherein, the first driving interface 411 is coupled with the pixel driving interface 402 to provide control signals including at least one pixel driving signal and a touch detection signal; and the second driving interface 412 provides an analog switch channel and/or at least one digital output signal $D_{OUT}$ according to a detection result of the touch detection signal. The analog switch channel has an input end for coupling with an input voltage $V_{IN}$ and an output end for providing an output voltage $V_{OUT}$, and the input voltage $V_{IN}$ can be a DC voltage or an AC voltage, wherein the analog switch channel can be a semiconductor switch channel, a photo coupler switch channel, a relay switch channel, or a reed switch channel.

The touch detection unit 413 includes a touch detection port to provide the touch detection signal, detect a signal parameter of the touch detection signal, and generate the detection result according to the signal parameter during a touch detection procedure, wherein the touch detection port is coupled with the first driving interface 411 and the touch detection procedure can be a self-capacitive touch detection procedure or a mutual-capacitive touch detection procedure.

The pixel driving unit 414 includes at least one driving output end to provide the at least one pixel driving signal.

The control unit 415 is coupled with the second driving interface 412, the touch detection unit 413, and the pixel driving unit 414 to control the second driving interface 412 to provide an analog switch channel and/or at least one digital output signal $D_{OUT}$ according to the detection result. The analog switch channel has an input end for coupling with an input voltage $V_{IN}$ and an output end for providing an output voltage $V_{OUT}$, and the input voltage $V_{IN}$ can be a DC voltage or an AC voltage, wherein the analog switch channel can be a semiconductor switch channel, a photo coupler switch channel, a relay switch channel, or a reed switch channel.

Figure 4D:
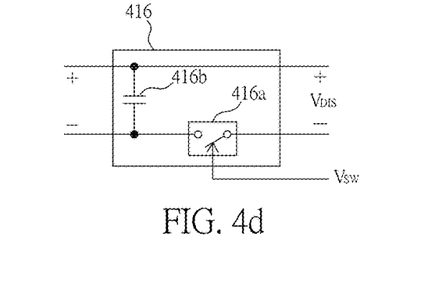
FIG. 4d illustrates a circuit diagram of an embodiment of the interruptible pixel driving circuit of FIG. 4c.

The interruptible pixel driving circuit 416, coupled between the first driving interface 411 and the at least one driving output end of the pixel driving unit 414, includes at least one isolation switch and at least one auxiliary capacitor, wherein, when the switch control unit 410 performs the touch detection procedure, the at least one isolation switch will be switched off, and the at least one auxiliary capacitor will provide electric energy to maintain a display status of the at least one flat self-luminous pixel. Please refer to FIG. 4d, which illustrates a circuit diagram of an embodiment of the interruptible pixel driving circuit 416. As illustrated in FIG. 4d, the interruptible pixel driving circuit 416 includes an isolation switch 416a and an auxiliary capacitor 416b, wherein, the isolation switch 416a is controlled by a switching signal $V_{SW}$ from the switch control unit 410. When the isolation switch 416a is switched on, a pixel driving signal $V_{DIS}$ from the pixel driving unit 414 will charge the auxiliary capacitor 416b and drive the self-luminous touch unit 400 via the first driving interface 411; and when the isolation switch 416a is switched off, a driving circuit loop including the pixel driving unit 414 will be interrupted so as not to interfere with a detection circuit loop including the touch detection unit 413, and the auxiliary capacitor 416b will provide electric energy to maintain a display status of the self-luminous touch unit 400. Besides, as the function of the isolation switch 416a is to prevent the driving circuit loop including the pixel driving unit 414 from interfering with the detection circuit loop including the touch detection unit 413, the installation of the isolation switch 416a is therefore not limited to the way shown in FIG. 4d, and other possible ways can be installing an isolation switch at the positive polarity of $V_{DIS}$, for example, or installing two isolation switches at the positive polarity and the negative polarity of $V_{DIS}$ respectively. Besides, the isolation switch can be implemented by at least one transistor or at least one diode (unilateral switch) or a combination of at least one transistor and at least one diode.

Figure 5:
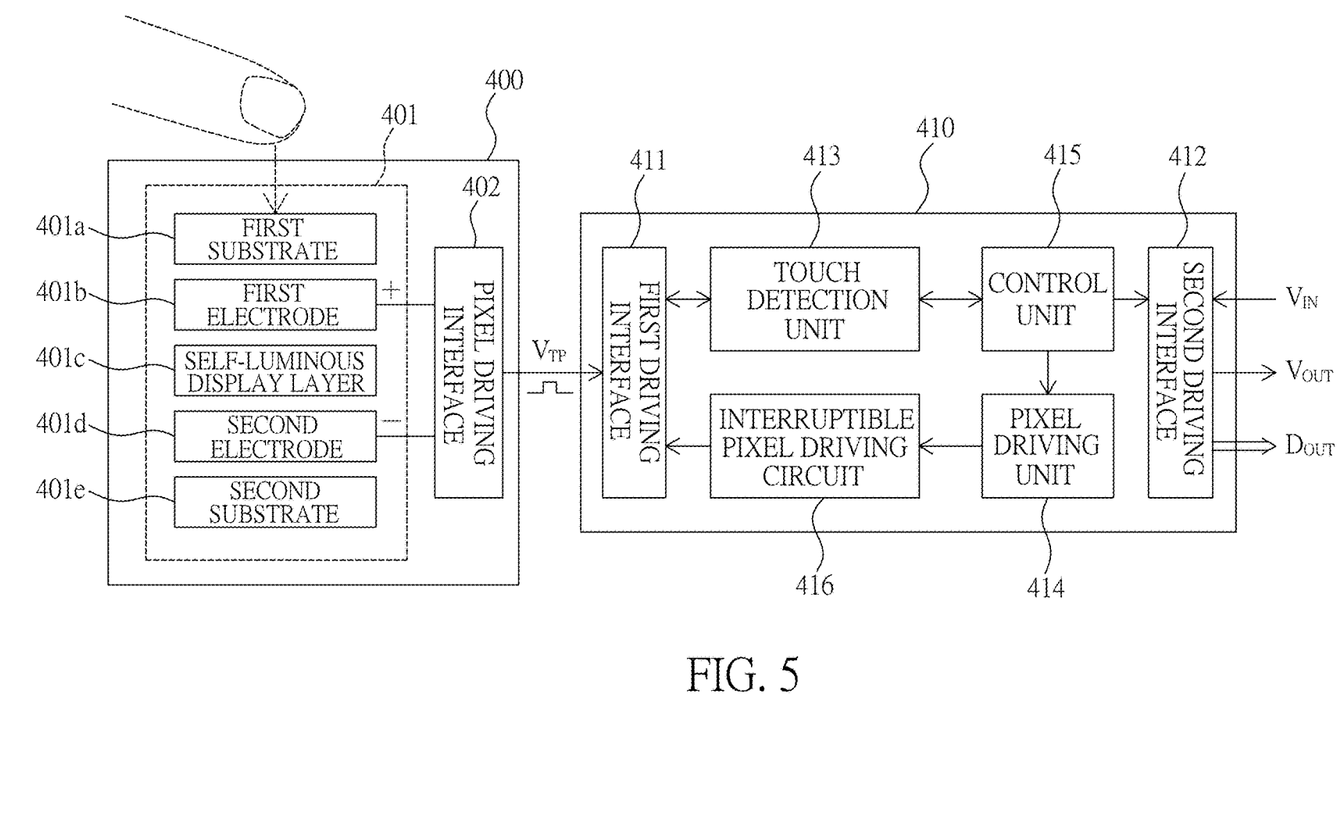
FIG. 5 illustrates an embodiment of the self-luminous touch unit of FIG. 4c.

Please refer to FIG. 5, which illustrates an embodiment of the self-luminous touch unit 400 of FIG. 4c. As illustrated in FIG. 5, the flat self-luminous pixel area 401 of the self-luminous touch unit 400 includes a first substrate 401a, a first electrode 401b, a self-luminous display layer 401c, a second electrode 401d, and a second substrate 401e, wherein, the first substrate 401a is a transparent substrate, and the first electrode 401b is a transparent electrode.

When the control unit 410 performs a touch detection procedure, the control unit 415 will drive the interruptible pixel driving circuit 416 to interrupt an electric connection between the pixel driving unit 414 and the first driving interface 411 to avoid interfering with the touch detection procedure, and the touch detection unit 413 will deliver a touch detection signal $V_{TP}$ via the first driving interface 411, and detect a parameter variation (the parameter variation can be, for example, voltage variation, current variation, phase variation, or frequency variation) of the touch detection signal $V_{TP}$ for determining whether a touch event occurs. Besides, an auxiliary capacitor can be installed inside the first driving interface 411 or at the output end of the interruptible pixel driving circuit 416 to provide electric energy to the self-luminous touch unit 400 to maintain a display status of the flat self-luminous pixel area 401 when the pixel driving unit 414 is isolated.

When an operator performs a touch operation on the first substrate 401a, the touch operation will result in a change on the touch detection signal $V_{TP}$ via the first electrode 401b, and the control unit 415 will drive the second driving interface 412 to provide an analog switch channel and/or at least one digital output signal $D_{OUT}$ according to the detection result of the touch detection unit 413.

Figure 6:
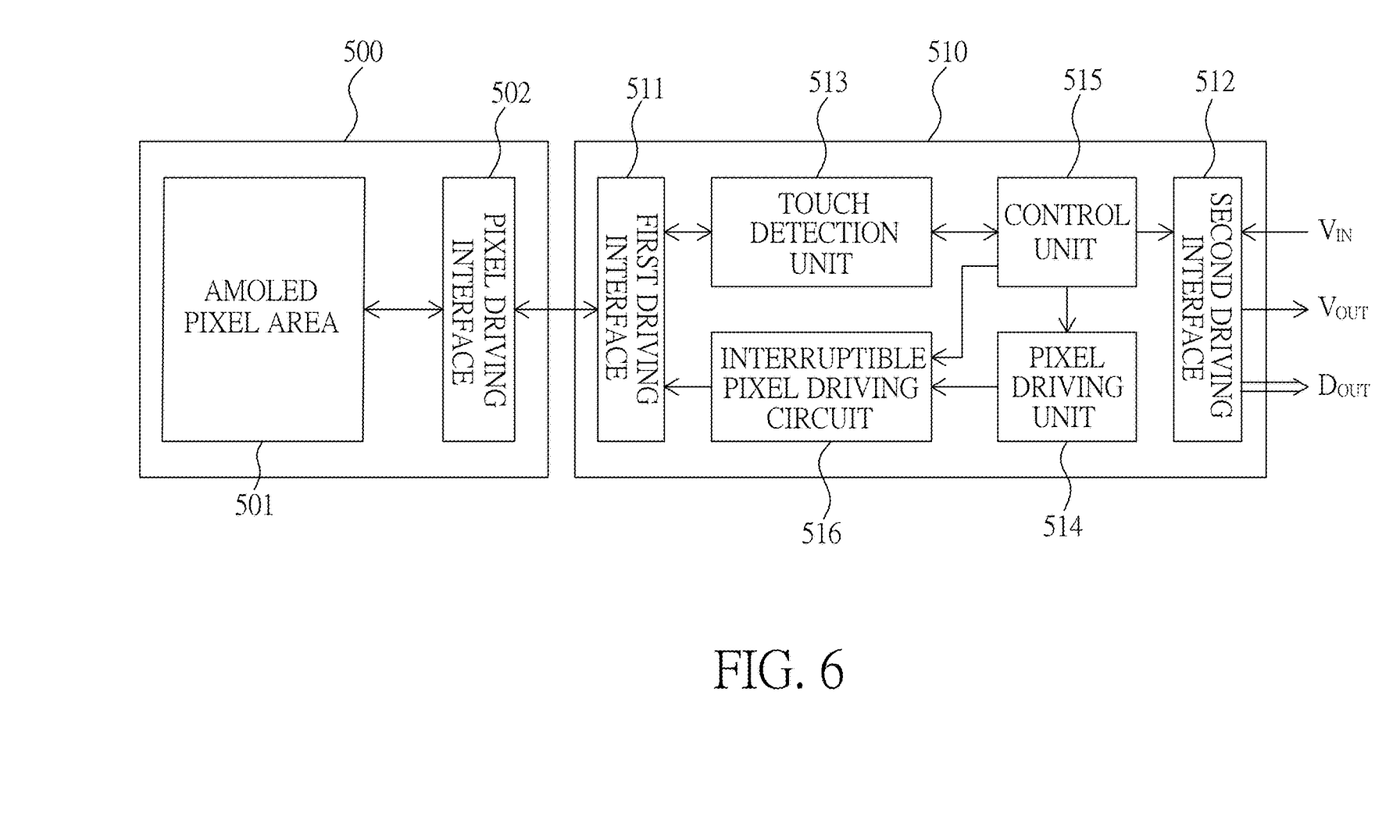
FIG. 6 illustrates a block diagram of a flat self-luminous touch switch according to another embodiment of the present invention.

Please refer to FIG. 6, which illustrates a block diagram of a flat self-luminous touch switch according to another embodiment of the present invention. As illustrated in FIG. 6, the flat self-luminous touch switch includes a self-luminous touch unit 500 and a switch control unit 510.

The self-luminous touch unit 500 includes an AMOLED (active mode organic light emitting diode) pixel area 501 and a pixel driving interface 502, wherein the AMOLED pixel area 501 includes at least one AMOLED pixel and each of the at least one AMOLED pixel includes a transistor-based constant current circuit to provide at least one light color and at least one light emitting direction, and the pixel driving interface 502 has a plurality of conductive contacts to couple with a plurality of conductive contacts of the AMOLED pixel area 501. Besides, at least one electrode of each AMOLED pixel is used for touch sensing.

The switch control unit 510 includes a first driving interface 511, a second driving interface 512, a touch detection unit 513, a pixel driving unit 514, a control unit 515, and an interruptible pixel driving circuit 516, wherein, the first driving interface 511 is coupled with the pixel driving interface 502 to provide control signals including at least one pixel driving signal and a touch detection signal; and the second driving interface 512 provides an analog switch channel and/or at least one digital output signal $D_{OUT}$ according to a detection result of the touch detection signal. The analog switch channel has an input end for coupling with an input voltage $V_{IN}$ and an output end for providing an output voltage $V_{OUT}$, and the input voltage $V_{IN}$ can be a DC voltage or an AC voltage, wherein the analog switch channel can be a semiconductor switch channel, a photo coupler switch channel, a relay switch channel, or a reed switch channel.

The touch detection unit 513 includes a touch detection port to provide the touch detection signal, detect a signal parameter of the touch detection signal, and generate the detection result according to the signal parameter during a touch detection procedure, wherein the touch detection port is coupled with the first driving interface 511 and the touch detection procedure can be a self-capacitive touch detection procedure or a mutual-capacitive touch detection procedure.

The pixel driving unit 514 includes at least one driving output end to provide the at least one pixel driving signal.

The control unit 515 is coupled with the second driving interface 512, the touch detection unit 513, and the pixel driving unit 514 to control the second driving interface 512 to provide an analog switch channel and/or at least one digital output signal $D_{OUT}$ according to the detection result. The analog switch channel has an input end for coupling with an input voltage $V_{IN}$ and an output end for providing an output voltage $V_{OUT}$, and the input voltage $V_{IN}$ can be a DC voltage or an AC voltage, wherein the analog switch channel can be a semiconductor switch channel, a photo coupler switch channel, a relay switch channel, or a reed switch channel.

The interruptible pixel driving circuit 516, coupled between the first driving interface 511 and the at least one driving output end of the pixel driving unit 514, includes at least one isolation switch (the isolation switch can be implemented by a transistor or a diode) and at least one auxiliary capacitor, wherein, when the switch control unit 510 performs the touch detection procedure, the at least one isolation switch will be switched off, and the at least one auxiliary capacitor will provide electric energy to maintain a display status of the at least one AMOLED pixel. Besides, the location of the interruptible pixel driving circuit 516 is not limited to inside the switch control unit 510; the interruptible pixel driving circuit 516 can also be installed between the AMOLED pixel area 501 and the pixel driving interface 502 of the self-luminous touch unit 500.

Besides, the self-luminous touch unit 500 can further have a photo sensing element, a solar cell, or an ESD protection element integrated therein.

Besides, the switch control unit 510 can be implemented by an integrated circuit of a package structure of COB, COG, COF, or SMT.

Besides, the digital output signal $D_{OUT}$ conveys touch input information or gesture input information.

Figure 7A:
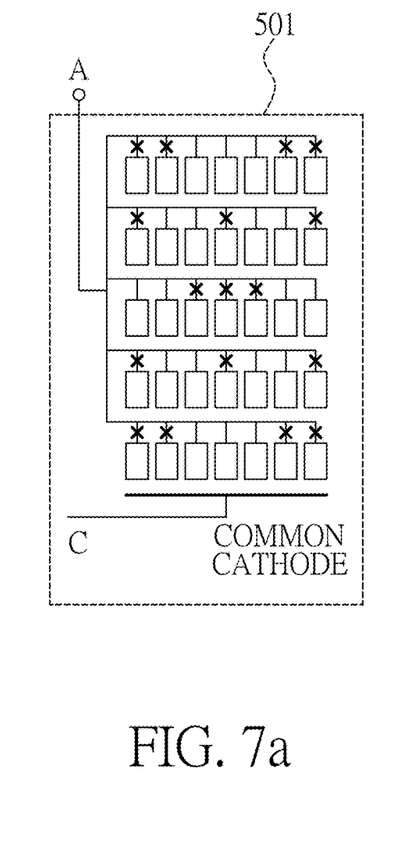
FIG. 7a illustrates a figure displayed by the AMOLED pixel area of FIG. 6.
Figure 7B:
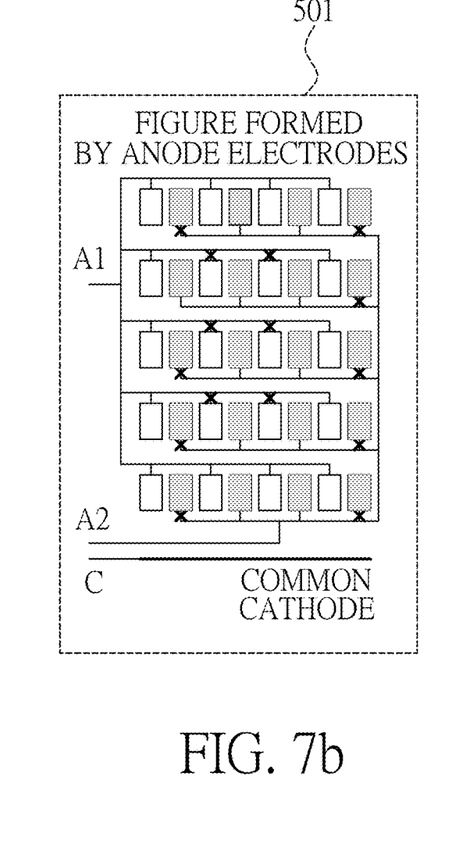
FIG. 7b illustrates another figure displayed by the AMOLED pixel area of FIG. 6.

Besides, the at least one AMOLED pixel can display at least one figure. Please refer to FIG. 7a, which illustrates a figure displayed by the AMOLED pixel area 501 of FIG. 6. As illustrated in FIG. 7a, a specific figure is displayed by disrupting electric connections between specific pixel electrodes and a common anode A. Please refer to FIG. 7b, which illustrates another figure displayed by the AMOLED pixel area 501 of FIG. 6. As illustrated in FIG. 7b, the AMOLED pixel area 501 has two common anodes A1, A2, and two specific figures can be displayed by disrupting electric connections between specific pixel electrodes and the two common anodes A1, A2. When the common anode A1 is driven, a first figure is displayed; when the common anode A2 is driven, a second figure is displayed; and when both the common anode A1 and the common anode A2 are driven, a third figure made up of the first figure and the second figure is displayed.

Figure 8:
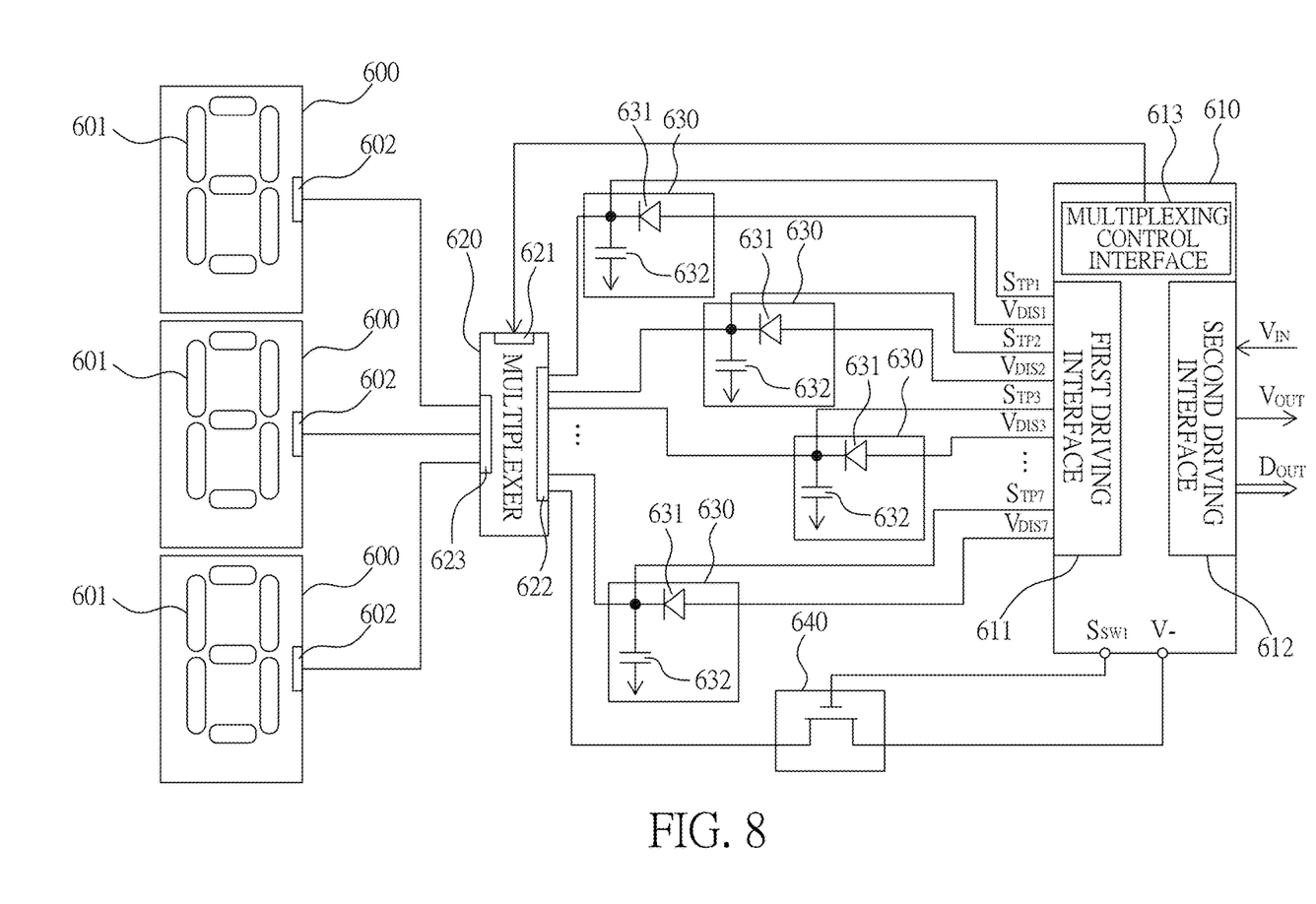
FIG. 8 illustrates a block diagram of a flat self-luminous touch switch according to still another embodiment of the present invention.

Based on the principles elaborated above, the flat self-luminous touch switch of the present invention can expand to include a plurality of self-luminous touch units. Please refer to FIG. 8, which illustrates a block diagram of a flat self-luminous touch switch according to still another embodiment of the present invention. As illustrated in FIG. 8, the flat self-luminous touch switch includes a plurality of self-luminous touch units 600, a switch control unit 610, a multiplexer 620, a plurality of interruptible pixel driving circuits 630, and an isolation switch 640.

Each of the plurality of self-luminous touch units 600 includes at least one flat self-luminous pixel 601 and a pixel driving interface 602.

The switch control unit 610 includes a first driving interface 611, a second driving interface 612, and a multiplexing control interface 613, wherein, the first driving interface 611 provides a plurality of pixel driving signals and transmit a plurality of touch detection signals; the second driving interface 612 provides an analog switch channel and/or at least one digital output signal $D_{OUT}$ according to a detection result of one of the plurality of touch detection signals; and the multiplexing control interface 613 provides a multiplexing control signal.

The multiplexer 620 has a control interface 621, an input interface 622, and an output interface 623, wherein the control interface 621 is coupled with the multiplexing control signal; the input interface 622 is coupled with the plurality of interruptible pixel driving circuits 630; and the output interface 623 is coupled with the pixel driving interface 602 of each of the plurality of self-luminous touch units 600.

The plurality of interruptible pixel driving circuits 630, coupled between the first driving interface 611 and the input interface 622 of the multiplexer 620, each including a unilateral switch 631 and an auxiliary capacitor 632; when the switch control unit 610 performs a touch detection procedure, at least one of the unilateral switches 631 will be switched off, and at least one of the auxiliary capacitors 632 will provide electric energy to maintain a display status of at least one of the self-luminous touch units 600, and the touch detection procedure can be a self-capacitive touch detection procedure or a mutual-capacitive touch detection procedure. Besides, when the switch control unit 610 performs the touch detection procedure, the isolation switch 640 is switched off to further make sure the touch detection procedure will be free of interference from any pixel driving unit.

Thanks to the proposals above, the present invention possesses the following advantages:

1. The flat self-luminous touch switch of the present invention is capable of providing a slim outline.
2. The flat self-luminous touch switch of the present invention is capable of providing a curved outline.
3. The flat self-luminous touch switch of the present invention is capable of providing a plurality of light colors, a plurality of color levels, and a plurality of displayed figures.
4. The flat self-luminous touch switch of the present invention is capable of preventing dust and moisture from entering the switch.
5. The flat self-luminous touch switch of the present invention is capable of providing a longer operation lifetime.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A flat self-luminous touch switch, comprising:
   a self-luminous touch unit, including at least one flat self-luminous pixel and a pixel driving interface, wherein the flat self-luminous pixel is implemented by a self-luminous structure selected from a group consisting of EL, PLED, and OLED; and
   a switch control unit, including a first driving interface and a second driving interface, wherein, the first driving interface is coupled with the pixel driving interface to provide at least one pixel driving signal and transmit a capacitive touch detection signal; and the second driving interface provides an analog switch channel and/or at least one digital output signal according to a detection result of the capacitive touch detection signal;
   wherein at least one electrode of each of the at least one flat self-luminous pixel is directly used as at least one capacitive touch sensing element, and wherein the switch control unit performs both a capacitive touch detection procedure and a display procedure, and performs the capacitive touch detection procedure with the at least one flat self-luminous pixel being powered by pre-stored electric energy of an auxiliary capacitor of an interruptible pixel driving circuit to maintain a display status when the switch control unit is disrupted from the at least one flat self-luminous pixel by the interruptible pixel driving circuit.

2. The flat self-luminous touch switch as disclosed in claim 1, wherein the self-luminous touch unit provides at least one light color and at least one light emitting direction.

3. The flat self-luminous touch switch as disclosed in claim 1, wherein the switch control unit further includes:
   a touch detection unit, including a touch detection port to provide the touch detection signal and detect a signal parameter of the touch detection signal during a touch detection procedure, and the touch detection unit generating the detection result according to the signal parameter, wherein the touch detection port is coupled with the first driving interface;
   a pixel driving unit, including at least one driving output end to provide the at least one pixel driving signal; and
   the interruptible pixel driving circuit, coupled between the first driving interface and the at least one driving output end of the pixel driving unit, including at least one isolation switch and at least one auxiliary capacitor, wherein, when the at least one isolation switch is switched off, the at least one auxiliary capacitor will provide electric energy to maintain a display status of the at least one flat self-luminous pixel.

4. The flat self-luminous touch switch as disclosed in claim 1, wherein the analog switch channel is selected from a group consisting of a semiconductor switch channel, a photo coupler switch channel, a relay switch channel, and a reed switch channel.

5. A flat self-luminous touch switch, comprising:
   a self-luminous touch unit, including at least one AMOLED pixel and a pixel driving interface; and
   a switch control unit, including a first driving interface and a second driving interface, wherein, the first driving interface is coupled with the pixel driving interface to provide at least one pixel driving signal and transmit a touch detection signal; and the second driving interface provides an analog switch channel and/or at least one digital output signal according to a detection result of the touch detection signal;
   wherein at least one electrode of each of the at least one AMOLED pixel is directly used as at least one touch sensing element, and wherein the switch control unit performs both a capacitive touch detection procedure and a display procedure, and performs the capacitive touch detection procedure with the at least one AMOLED pixel being powered by pre-stored electric energy of an auxiliary capacitor of an interruptible pixel driving circuit to maintain a display status when the switch control unit is disrupted from the at least one AMOLED pixel by the interruptible pixel driving circuit.

6. The flat self-luminous touch switch as disclosed in claim 5, wherein the self-luminous touch unit provides at least one light color and at least one light emitting direction.

7. The flat self-luminous touch switch as disclosed in claim 5, wherein the interruptible pixel driving circuit is coupled between the at least one AMOLED pixel and the pixel driving interface and includes at least one isolation switch and at least one auxiliary capacitor, wherein, when the at least one isolation switch is switched off, the at least one auxiliary capacitor will provide electric energy to maintain a display status of the at least one AMOLED pixel.

8. The flat self-luminous touch switch as disclosed in claim 7, wherein the self-luminous touch unit further includes at least one constant current circuit to drive the at least one AMOLED pixel.

9. The flat self-luminous touch switch as disclosed in claim 5, wherein the capacitive touch detection procedure is selected from a group consisting of self-capacitive touch detection procedure and mutual-capacitive touch detection procedure.

10. The flat self-luminous touch switch as disclosed in claim 9, wherein the self-luminous touch unit further has a photo sensing element, a solar cell, or an ESD protection element integrated therein.

11. The flat self-luminous touch switch as disclosed in claim 5, wherein the switch control unit further includes:
    a touch detection unit, including a touch detection port to provide the touch detection signal and detect a signal parameter of the touch detection signal, wherein the touch detection port is coupled with the first driving interface;

a pixel driving unit, including at least one driving output end to provide the at least one pixel driving signal; and the interruptible pixel driving circuit, coupled between the first driving interface and the pixel driving unit, including at least one isolation switch and at least one auxiliary capacitor, wherein, when the at least one isolation switch is switched off, the at least one auxiliary capacitor will provide electric energy to maintain a display status of the at least one AMOLED pixel.

12. The flat self-luminous touch switch as disclosed in claim 5, wherein the switch control unit is implemented by an integrated circuit having a package structure selected from a group consisting of COB, COG, COF, and SMT.

13. The flat self-luminous touch switch as disclosed in claim 5, wherein the digital output signal conveys touch input information or gesture input information.

14. The flat self-luminous touch switch as disclosed in claim 5, wherein the at least one AMOLED pixel displays at least one figure.

15. A flat self-luminous touch switch, comprising:

a plurality of self-luminous touch units, each including at least one flat self-luminous pixel and a pixel driving interface, wherein the flat self-luminous pixel is implemented by a self-luminous structure selected from a group consisting of EL, PLED, and OLED;

a switch control unit, including a first driving interface, a second driving interface, and a multiplexing control interface, wherein, the first driving interface provides a plurality of pixel driving signals and transmit a plurality of capacitive touch detection signals; the second driving interface provides an analog switch channel and/or at least one digital output signal according to a detection result of one of the plurality of capacitive touch detection signals; and the multiplexing control interface provides a multiplexing control signal;

a multiplexer, having a control interface, an input interface, and an output interface, wherein the control interface is coupled with the multiplexing control signal, the output interface is coupled with the pixel driving interface of each of the plurality of self-luminous touch units; and a plurality of interruptible pixel driving circuits, coupled between the first driving interface and the input interface of the multiplexer, each including a unilateral switch and an auxiliary capacitor;

wherein, when the at least one of the unilateral switches is switched off, at least one of the auxiliary capacitors will provide electric energy to maintain a display status of at least one of the self-luminous touch units;

wherein at least one electrode of each of the at least one flat self-luminous pixel is directly used as at least one touch sensing element; the switch control unit performs both a capacitive touch detection procedure and a display procedure, and performs the capacitive touch detection procedure with the at least one flat self-luminous pixel being powered by pre-stored electric energy of an auxiliary capacitor of an interruptible pixel driving circuit to maintain a display status when the switch control unit is disrupted from the at least one flat self-luminous pixel by the interruptible pixel driving circuit.

* * * * *